Jan. 11, 1927.
A. A. CONWAY
1,614,345
FRICTION CLUTCH
Filed August 18, 1924    2 Sheets-Sheet 2
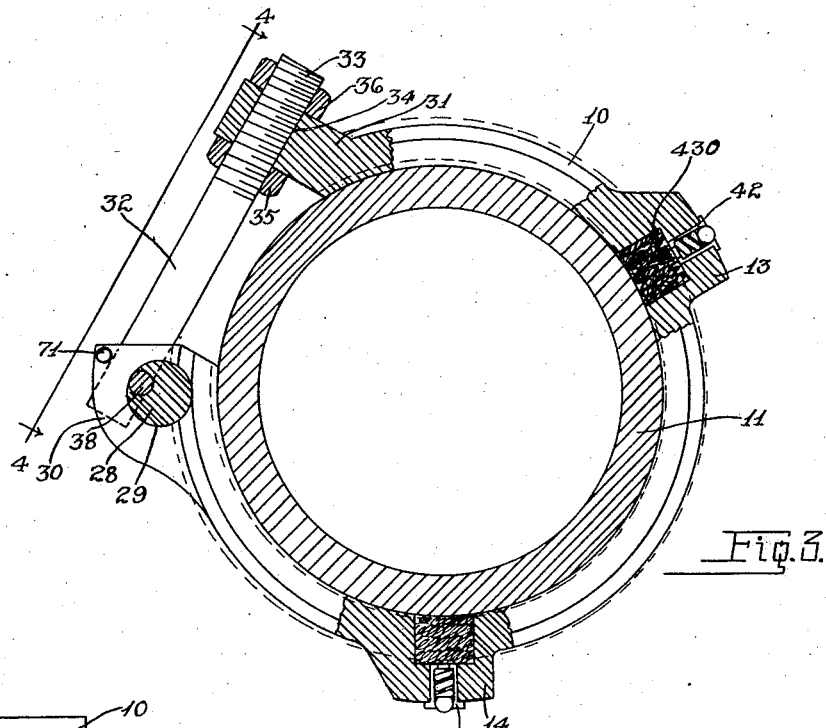
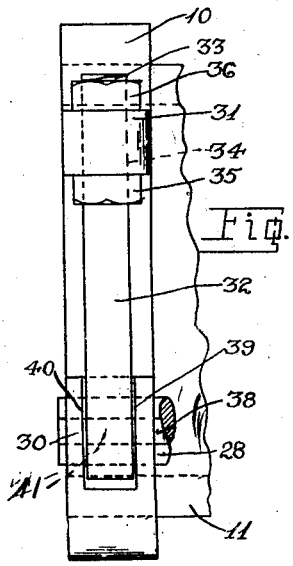
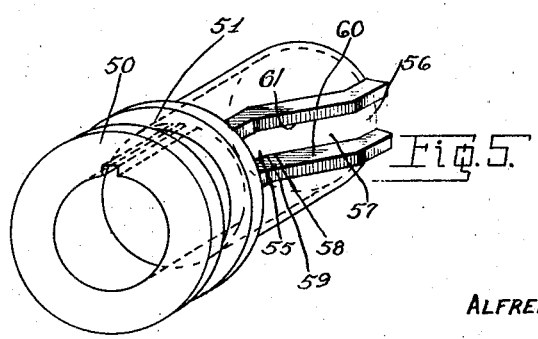
Inventor
ALFRED A. CONWAY.
Attorneys Patented Jan. 11, 1927.

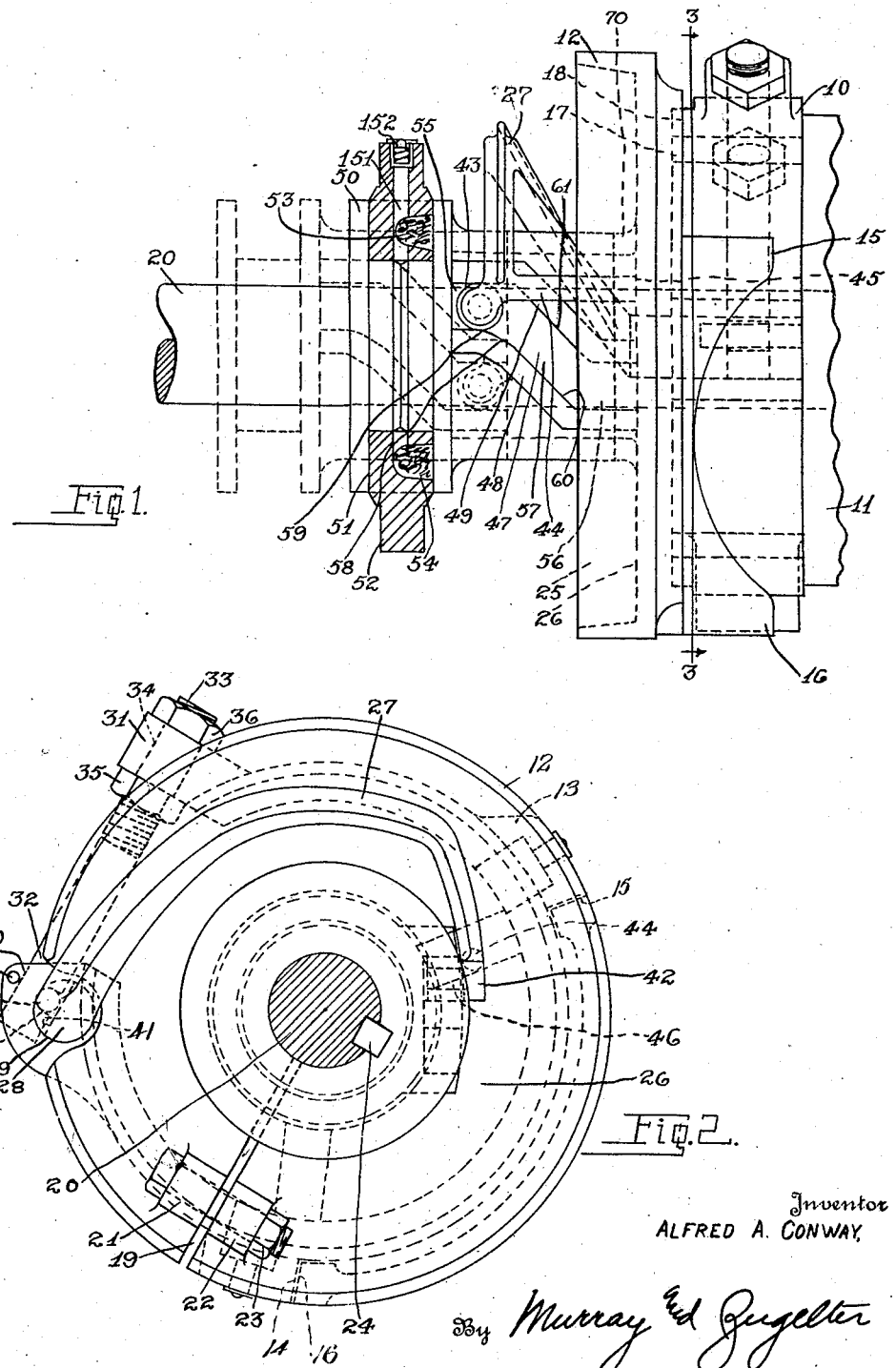

1,614,345

UNITED STATES PATENT OFFICE.

ALFRED A. CONWAY, OF CINCINNATI, OHIO.

FRICTION CLUTCH.

Application filed August 18, 1924. Serial No. 732,673.

An object of my invention is to provide a friction type clutch provided with means for positively actuating the friction band for bringing same into and releasing same from driving engagement upon the clutch drum associated therewith.

Another object of my invention is to provide a device wherein metals have little or no inherent spring qualities may be utilized as the clutch band.

Another object of my invention is to provide a simple and efficient device for the purposes stated.

These and other objects are attained by the means described herein, and disclosed in the accompanying drawings, in which:

Fig. 1 is a side elevation of a device embodying my invention.

Fig. 2 is an end elevation of the device shown in Fig. 1.

Fig. 3 is a sectional view on line 3—3 of Fig. 1.

Fig. 4 is a fragmental view on line 4—4 of Fig. 3.

Fig. 5 is a perspective view of a sliding collar forming a detail of my invention.

The device of my invention comprises a friction band 10 into which may extend a friction drum 11. The friction drum 11 may be carried by a pulley or any other means to which motion is to be imparted. The friction band 10 is provided with lugs 13 and 14 that are engaged by lugs 15 and 16 respectively, extending from the carrier plate 12. Said lugs 13 to 16 inclusive, serve as means for transmitting motion between the carrier plate and the clutch band. The carrier plate is provided with a recess 17 adapted to receive a ring-like formation 18 developed upon the clutch band, said structure serving as a centering means for the clutch band. The carrier plate 12 is split as disclosed at 19, to facilitate mounting and demounting thereof upon the shaft 20. Bored lugs 21 and 22 are provided on opposite sides of the split 19 and a bolt and nut structure 23, for co-operation with said lugs 21 and 22, is provided for clamping the carrier plate upon the shaft 20. The usual key 24 connects the shaft and the carrier plate. The carrier plate 12 is recessed as indicated at 25, the radially extending wall 26 defining the depth of the said recess. A lever arm 27 has an extension 28 having its axis disposed in substantial parallelism with the axis of the shaft 20. The said extension 28 has a bearing upon the wall 29 of a bore formed in the ear 30, developed at one end of the clutch band. The other end of the clutch band carries an ear 31. A latch 32 has its end 33 reduced and threaded. The said reduced end of the latch extends through a bore 34 provided in the ear 31 and has mounted upon it adjustment nuts 35 and 36 whereby the latch may be fixedly mounted in various adjusted positions upon the ear 31. The free end of the latch is provided with a notch 37 adapted to receive an eccentrically mounted pin 38 carried by the extension 28 of the lever arm 27, said pin 38 extending between the opposed walls 39 and 40 of a notch 41 provided in the extension 28. The pin 38 may be secured in position in any suitable manner such as by coring the extension 28 whereby to provide a seat for the pin. From the foregoing, it will be evident that as the lever 27 is oscillated in the ear 30, the latch 32 will be moved longitudinally whereby to positively expand and contract the split friction band 10. In Fig. 3 the friction band 10 is shown in full lines in its contracted position, and is shown in dotted lines in its expanded or released position. Suitable oil wells 42 are provided in the lugs 13 and 14 for introducing a lubricant to the felt padding or the like 430 serving as a means for lubricating the friction drum 11 and the clutch band 10 whereby to minimize wear of said members when not in driving engagement with one another.

The free end 42 of the lever 27 is provided with a roller bearing 43 and with a guide bearing or finger 44. The finger 44 has its end 45 in sliding engagement upon the wall 26 of the recess 25 and serves as a spacing and supporting means for the free end 42 of the lever 27. The roller bearing 43 is mounted upon a stud bearing 46 carried by the free end of the arm 27 and is so positioned that the roller bearing is disposed within a groove or way 47 developed between the ribs 48 and 49 formed on the shifting collar 50, and the shifting collar 50 is provided with the customary groove 51, adapted to receive a shifting yoke 52, that may be actuated by any suitable lever mechanism. The yoke 52 is provided with a suitable lubricating structure comprising a well 151 to which access is controlled by a check valve 152, and suitable lubricant distributing means such as the felt rings 53 disposed within and in the recess 54 communicating with the well 151. It will be noted that the groove 47 comprises portions 55 and 56 extending in substantial parallelism with the shaft 20, and that said portions are connected with one another by the angularly disposed portion 57 of the groove. The major portion of the intermediate portion 57 of the groove 47 extends at an angle of substantially 45 degrees to the portions 55 and 56, except for the surface 58 of said groove, which surface extends at substantially an angle of thirty degrees to the portion 56 and is gradually rounded off as indicated at 59, whereby to pass such surface through the various degrees, from fifteen to zero for providing a diminishing curve of increasing pressure.

The collar 50 is splined to the shaft 20 by means of the key 24. The operation of my device is as follows:

When the collar 50 is in the position indicated in dotted lines in Fig. 1 the clutch drum 11 is released from the clutch band 10. At this time the roller bearing 43 is disposed in the end 56 of the slot 47. As the collar 50 is moved along the shaft 20, toward the right, as shown in Fig. 1, the roller bearing 43 follows the contour of the inner wall 60 of the groove 47 thereby actuating the extension 28 of the lever 27 for drawing the ears 30 and 31 of the clutch band together for frictionally clamping the clutch band upon the clutch drum. When the roller 43 enters the portion 55 of the groove 47 the engagement of the roller upon the walls of said end 55 of the groove 47 serves to retain the clutch band in binding engagement upon the clutch drum. When it is desired to release the drum from the band, the collar 50 is moved in the opposite direction, and the engagement of the roller bearing 43 upon the wall 61 of the rib 49 serves to positively actuate the lever extension 28 and the latch 32 in the opposite direction for expanding the clutch band thereby releasing the drum. When the band and drum are in driving engagement, the end of the shifting collar abuts the end of the hub 70 formed on the carrier plate, thereby serving to co-operate with the other elements in locking the lever against movement. A pin 71 serves to preclude disassociation of the latch 32 and the pin 38.

What I claim is:

1. A clutch of the class described comprising a carrier plate having a recess in its one side, a split clutch band supported by the carrier plate and arranged to move therewith, a clutch drum for engagement by the clutch band whereby to transmit motion from the band to the drum, a lever carried by the band and having a pivotal mounting upon the band, the pivotally mounted portion of the lever having an eccentric bearing thereon, a latch having its one end fixedly mounted on the band and having a second end engaging the eccentric bearing whereby movement of the lever will reciprocate the latch for expanding and contracting the split band, a second bearing carried by the lever, a guide finger carried by the lever extending into the recess in the carrier plate and arranged to engage the wall of the recess in the carrier plate for supporting and guiding said lever, and a shifting collar mounted for reciprocation relative to the lever and having a slot therein for the reception of the second mentioned bearing formed on the lever, the engagement of the said second bearing of the lever upon the walls of the slot in the shifting collar serving to positively actuate the lever in opposite directions and to retain the lever in its opposed limits of movement.

2. A clutch of the class described comprising a carrier plate having a recess in its one side, a split clutch band supported by the carrier plate and arranged to move therewith, a clutch drum for engagement by the clutch band whereby to transmit motion from the band to the drum, a lever carried by the band and having a pivotal mounting upon the band, the pivotally mounted portion of the lever having an eccentric bearing thereon, a latch having its one end fixedly mounted on the band and having a second end engaging the eccentric bearing whereby movement of the lever will reciprocate the latch for expanding and contracting the split band, a second bearing carried by the lever, a guide finger carried by the lever extending into the recess in the carrier plate and arranged to engage the wall of the recess in the carrier plate for supporting and guiding said lever, a shifting collar mounted for reciprocation relative to the lever and having a slot therein for the reception of the second mentioned bearing formed on the lever, the engagement of the said second bearing of the lever upon the walls of the slot in the shifting collar serving to positively actuate the lever in opposite directions and to retain the lever in its opposed limits of movement, and means for lubricating the contacting faces of the shoe and the band.

3. A clutch of the class described comprising a carrier plate having a recess in its one side, a split clutch band supported by the carrier plate and arranged to move therewith, a clutch drum for engagement by the clutch band whereby to transmit motion from the band to the drum, a lever carried by the band and having a pivotal mounting upon the band, the pivotally mounted portion of the lever having an eccentric bearing thereon, a latch having its one end fixedly mounted on the band and having a second end engaging the eccentric bearing whereby movement of the lever will reciprocate the latch for expanding and contracting the split band, a second bearing carried by the lever, a guide finger carried by the lever extending into the recess in the carrier plate and arranged to engage the wall of the recess in the carrier plate for supporting and guiding said lever, and a shifting collar mounted for reciprocation relative to the lever and having a way therein for the reception of the second mentioned bearing formed on the lever, the engagement of the said second bearing of the lever upon the walls of the way in the shifting collar serving to positively actuate the lever in opposite directions and to retain the lever in its opposed limits of movement, a shifting fork connected with the shifting collar, and means for lubricating the shifting fork and shifting collar.

4. An external contacting band type clutch of the class described comprising a clutch drum, a split clutch band of substantially nonresilient material, for engagement on said drum, a latch fixedly mounted upon the band at one end thereof, a lever pivotally mounted on the band at a second end thereof, an eccentric bearing formed on the lever and engaging the latch whereby movement of the lever will reciprocate the latch for positively moving the band in one direction for frictional engagement upon the drum and for positively moving the band in the opposite direction for releasing the drum from the band, and means for positively actuating the lever.

5. A clutch of the class described, comprising a clutch drum, a split clutch band for engagement on the outer surface of said drum, a latch fixedly mounted upon the band at one end thereof, a lever pivotally mounted upon a second end of the band, an eccentric bearing formed on the lever and engaging the latch whereby movement of the lever will positively reciprocate the latch for binding the band upon the drum and for positively releasing the band from the drum, a shaft, a split carrier plate mounted on the shaft, and reciprocating means carried by the shaft for positively actuating the lever whereby the clutch band is positively actuated to bind and to release the drum.

6. A clutch of the class described comprising a clutch drum, a split clutch band of nonresilient material for engagement on said drum, a latch fixedly mounted on the band at one end thereof, a lever pivotally mounted on the band at a second end thereof, an eccentric bearing formed on the lever and engaging the latch whereby movement of the lever will reciprocate the latch for positively moving the band in one direction for binding the band upon the drum and for positively moving the band in the opposite direction for releasing the band from the drum, means for actuating the lever comprising a shifting collar arranged for reciprocation relative to the lever and having a substantially double curve slot formed therein, and a roller bearing carried by the lever and extending into the slot in the collar.

7. A clutch of the class described comprising a clutch drum, a non-resilient split clutch band for engagement upon said drum, a latch fixedly mounted upon the band at one end thereof, a lever pivotally mounted on the band at the second end thereof, an eccentric bearing formed on the lever and engaging the latch whereby movement of the lever will positively reciprocate the latch for binding the band upon the drum and for releasing the band from the drum, means for positively moving the lever in one direction whereby the non-resilient band is positively moved into frictional engagement with the drum and for positively moving the lever in the opposite direction whereby the non-resilient band is positively moved in the opposite direction for releasing the drum from the band, and means for locking the lever at its opposite limits of movement.

In testimony whereof, I have hereunto subscribed my name this 13th day of August, 1924.

ALFRED A. CONWAY.